United States Patent
Kwon et al.

(10) Patent No.: US 8,895,174 B2
(45) Date of Patent: Nov. 25, 2014

(54) CABLE-TYPE SECONDARY BATTERY

(71) Applicant: LG Chem, Ltd., Seoul (KR)

(72) Inventors: Yo-Han Kwon, Daejeon (KR); Je-Young Kim, Daejeon (KR); Hyung-Ju Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/966,619

(22) Filed: Aug. 14, 2013

(65) Prior Publication Data

US 2013/0344368 A1    Dec. 26, 2013

Related U.S. Application Data

(63) Continuation of application No. PCT/KR2012/001223, filed on Feb. 17, 2012.

(30) Foreign Application Priority Data

Feb. 17, 2011  (KR) .................. 10-2011-0014162
Feb. 17, 2012  (KR) .................. 10-2012-0016439

(51) Int. Cl.
*H01M 6/00*  (2006.01)
*H01M 8/00*  (2006.01)
*H01M 2/00*  (2006.01)
*H01M 10/00*  (2006.01)

(52) U.S. Cl.
USPC ........................................... 429/127; 429/163

(58) Field of Classification Search
None
See application file for complete search history.

(56) References Cited

U.S. PATENT DOCUMENTS

| 5,278,002 A | 1/1994 | Hiers |
| 2003/0027002 A1 | 2/2003 | Simpson et al. |

FOREIGN PATENT DOCUMENTS

| CN | 101855746 A | 10/2010 |
| JP | 08-501655 A | 2/1996 |
| JP | 09-007629 A | 1/1997 |
| JP | 2643019 B2 | 8/1997 |
| JP | 10-239461 | 9/1998 |
| JP | 2001-110445 A | 4/2001 |
| JP | 2001110244 A | 4/2001 |
| JP | 2004-047208 A | 2/2004 |
| JP | 2004-537425 A | 12/2004 |
| JP | 2006190603 A | 7/2006 |

(Continued)

OTHER PUBLICATIONS

International Search Report for Application No. PCT/KR2012/001223 dated Sep. 28, 2012.

*Primary Examiner* — Cynthia K. Walls
(74) *Attorney, Agent, or Firm* — Lerner, David, Littenberg, Krumholz & Mentlik, LLP

(57) ABSTRACT

A cable-type secondary battery is provided. The cable-type secondary battery includes an electrode assembly and a covering capable of surrounding the electrode assembly. The electrode assembly includes a first polarity electrode, a second polarity electrode, and a separator or an electrolyte layer interposed between the two electrodes. Each of the electrodes has an elongated shape and a structure in which an electrode active material is applied to the surface of a current collector whose shape in cross section orthogonal to the lengthwise direction thereof is circular, elliptical or polygonal. The covering includes a thermally conductive cover member as an upper half part and a thermally insulating cover member as a lower half part. The upper half part and the lower half part are divided by a horizontal plane passing the center of the cross section orthogonal to the lengthwise direction of the cable-type secondary battery.

14 Claims, 1 Drawing Sheet

(56) References Cited

FOREIGN PATENT DOCUMENTS

| | | |
|---|---|---|
| JP | 2010-092879 A | 4/2010 |
| JP | 2010-129412 A | 6/2010 |
| KR | 100804411 B1 | 2/2008 |
| KR | 20090113430 A | 11/2009 |
| KR | 2010-0098227 A | 9/2010 |
| WO | 2005098994 A1 | 10/2005 |
| WO | 2006077192 A1 | 7/2006 |
| WO | 2009/061088 A1 | 5/2009 |

CABLE-TYPE SECONDARY BATTERY

CROSS-REFERENCE TO RELATED APPLICATION

This application is a continuation of International Application No. PCT/KR2012/001223 filed on Feb. 17, 2012, which claims priority to Korean Patent Application Nos. 10-2011-0014162 and 10-2012-0016439 filed in the Republic of Korea on Feb. 17, 2011 and Feb. 17, 2012, respectively, the entire contents of which are incorporated herein by reference.

TECHNICAL FIELD

The present disclosure relates to a cable-type secondary battery whose shape is changed freely, and more specifically to a cable-type secondary battery including a covering that surrounds a cable-type electrode assembly and have functions of both thermal conduction and thermal insulation.

BACKGROUND ART

Recent advances in wireless communication technologies have led to the popularization of mobile devices. To keep pace with the advanced wireless technologies, there is a strong tendency to essentially use secondary batteries as power sources for devices. On the other hand, electric automobiles and hybrid automobiles are currently being developed for the purpose of preventing environmental pollution. These vehicles also use secondary batteries as power sources.

In many other industrial fields, there has been a dramatic increase in the frequent use of secondary batteries. The power output, capacity and structure of secondary batteries become more diverse depending on the characteristics required in applications they are used.

Generally, a secondary battery includes an electrode assembly having a configuration in which a separator is interposed between a cathode and an anode, each of which is produced by applying an electrode active material to the surface of a planar current collector. The electrode assembly is usually accommodated in a cylindrical or prismatic metal can or a pouch-type case made of an aluminum laminate sheet, together with a liquid or solid electrolyte. Alternatively, the electrode assembly may have a jelly-roll configuration in which a sheet-like cathode/separator/anode structure is wound, or a structure in which a plurality of thin plate-like unit electrodes are laminated sequentially. This configuration or structure is advantageous in enhancing the capacity of the secondary battery. In any case, all electrodes (i.e. the cathode and the anode) of the electrode assembly structures are essentially planar in shape.

Such conventional planar electrode structures have the advantage of high degree of integration upon winding or lamination, but have a limitation in that they are difficult to structurally modify according to the needs of industrial fields. The planar electrode structures are susceptible to changes in the volume of the electrodes during charge and discharge. Other problems of the planar electrode structures are that gases produced from the cells do not easily escape outside and there may be a large potential difference between the electrodes.

Particularly, diverse kinds of devices using secondary batteries have emerged in the market in response to various needs of consumers, and their designs have gained importance. Despite this trend, even specially designed devices necessitate additional areas or spaces where secondary batteries having traditional structures and/or shapes (cylindrical, prismatic or pouch type) can be mounted. This necessity is considered a major obstacle in extending wireless technologies or overcoming the limitations of design. For example, to mount a secondary battery in a narrow and long space of a newly developed device, it is substantially impossible or very inefficient to structurally modify a secondary battery including an electrode assembly based on planar electrodes that are currently in use. That is, conventional cylindrical, coin-type and prismatic batteries are difficult to structurally modify (e.g., distort or bend) in an arbitrary manner depending on where they are used, due to their predetermined shapes. In an attempt to solve these problems, an electrode assembly having a new structure and a secondary battery including the same are disclosed in Korean Patent No. 10-0804411, which was filed by the present applicant on Jan. 17, 2006 and was patented on Feb. 12, 2008, the contents of which in its entirety are herein incorporated by reference.

However, heat is produced from the secondary battery (hereinafter, also referred to as a "cable-type secondary battery") during charge and discharge, leading to a temperature rise of the battery. As a result, the battery suffers from performance deterioration and a user may feel discomfort or even may get burned upon contact with the battery.

DISCLOSURE

Technical Problem

The present disclosure is designed to solve the problems of the prior art, and therefore it is an object of the present disclosure to provide a structurally improved cable-type secondary battery whose shape is easy to change while maintaining its good stability and performance.

Technical Solution

According to the present disclosure, there is provided a cable-type secondary battery including: an electrode assembly including a first polarity electrode, a second polarity electrode, and a separator or an electrolyte layer interposed between the two electrodes, each of the electrodes having an elongated shape and a structure in which an electrode active material is applied to the surface of a current collector whose shape in cross section orthogonal to the lengthwise direction thereof is circular, elliptical or polygonal; and a covering capable of surrounding the electrode assembly, wherein the covering includes a thermally conductive cover member as an upper half part and a thermally insulating cover member as a lower half part, which are divided by a horizontal plane passing the center of the cross section orthogonal to the lengthwise direction of the cable-type secondary battery.

The thermally conductive cover member may be composed of a mixture including a thermoplastic polymer resin and a filler. The filler is preferably present in an amount of 20 to 70 parts by weight, based on 100 parts by weight of the thermoplastic polymer resin. For example, the thermoplastic polymer resin constituting the thermally conductive cover member may be selected from the group consisting of polyolefin, polyoxymethylene, polyamide, polysulfone, polyester, polycarbonate and polyvinyl chloride. The filler may be, for example, alumina, iron oxide or beryllium oxide.

The thermally insulating cover member may include at least one polymer selected from the group consisting of polyester, polyamide, polyether sulfone, polyetherimide, polyimide, polyamideimide, polyamide siloxane, polyurethane, polystyrene, polycarbonate and polymethyl methacrylate.

The first polarity electrode has a polarity opposite to that of the second polarity electrode. That is, when the first polarity electrode is an anode, the second polarity electrode is a cathode, or vice versa. Preferably, the first polarity electrode is an anode and the second polarity electrode is a cathode.

Preferably, the current collectors of the first and second polarity electrodes are each independently made of stainless steel, aluminum, nickel, titanium, baked carbon, copper, stainless steel surface treated with carbon, nickel, titanium or silver, an aluminum-cadmium alloy, a non-conductive polymer surface treated with a conductive material, or a conductive polymer. For example, the conductive material may be selected from the group consisting of polyacetylene, polyaniline, polypyrrole, polythiophene, poly(sulfur nitride), indium tin oxide (ITO), copper, silver, palladium and nickel. For example, the conductive polymer may be selected from the group consisting of polyacetylene, polyaniline, polypyrrole, polythiophene and poly(sulfur nitride).

For example, the electrode material of the first polarity electrode may be selected from the group consisting of: carbonaceous materials, such as natural graphite and artificial graphite; metals (Me), such as lithium-containing titanium composite oxides (LTO), Si, Sn, Li, Zn, Mg, Cd, Ce, Ni and Fe; alloys of the metals (Me); oxides (MeOx) of the metals (Me); and composites of the metals (Me) with carbon. For example, the electrode material of the second polarity electrode may be selected from the group consisting of $LiCoO_2$, $LiNiO_2$, $Li_2Mn_2O_4$, $LiCoPO_4$, $LiFePO_4$, $LiNiMnCoO_2$, and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$, $x+y+z \geq 1$).

For example, the electrolyte layer may be formed of a gel-type solid electrolyte using PEO, PVdF, PMMA, PAN or PVAC, or a solid polymer electrolyte using PEO, polypropylene oxide (PPO), polyethylene imine (PEI), polyethylene sulphide (PES) or polyvinyl acetate (PVAc).

The electrolyte layer may further include a lithium salt. For example, the lithium salt may be selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylate and lithium tetraphenylborate.

Advantageous Effects

The use of a thermally conductive cover member as the upper half part in the cable-type secondary battery of the present disclosure can facilitate the release of heat from the battery, contributing to improvements in the stability and performance of the battery. In addition, the use of a thermally insulating cover member as the lower half part can block the transfer of heat to the outside of the battery. Therefore, the cable-type secondary battery of the present disclosure causes no discomfort to the skin of a user and prevents the possibility that his/her skin may get burned upon contact with the battery.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
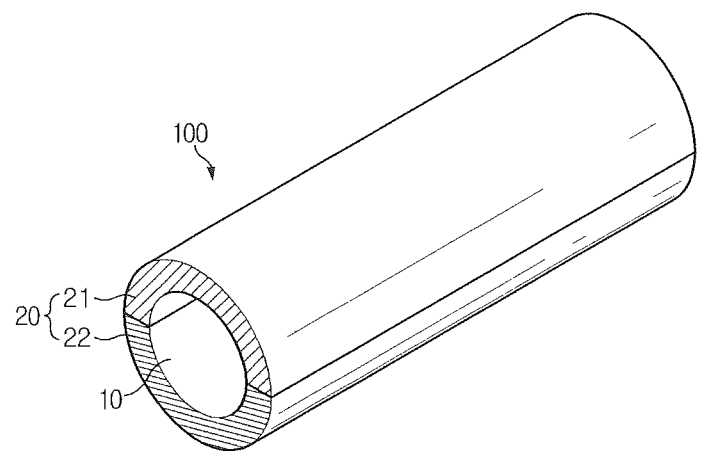
FIG. 1 is a view of a cable-type secondary battery according to an embodiment.
Figure 2:
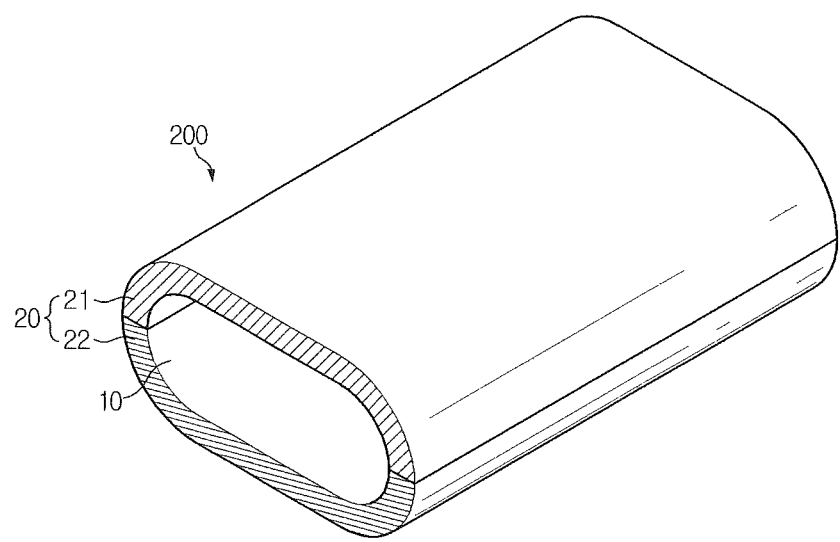
FIG. 2 is a view of a cable-type secondary battery according to an embodiment.

FIGS. 1 and 2 schematically illustrate embodiments of a cable-type secondary battery according to the present disclosure. However, the description proposed herein is just a preferable example for the purpose of illustrations only, not intended to limit the scope of the disclosure, so it should be understood that other equivalents and modifications could be made thereto without departing from the spirit and scope of the disclosure at the time of filing the present application.

Referring to FIG. 1, the cable-type secondary battery 100 of the present disclosure includes: an electrode assembly 10 including a first polarity electrode, a second polarity electrode, and a separator or an electrolyte layer interposed between the two electrodes, each of the electrodes having an elongated shape and a structure in which an electrode active material is applied to the surface of a current collector whose shape in cross section orthogonal to the lengthwise direction thereof is circular or symmetrically or asymmetrically elliptical or polygonal; and a covering 20 capable of surrounding the electrode assembly, wherein the covering includes a thermally conductive cover member as an upper half part 21 and a thermally insulating cover member as a lower half part 22, which are divided by a horizontal plane passing the center of the cross section orthogonal to the lengthwise direction of the cable-type secondary battery. The cable-type secondary battery of the present disclosure has a linear structure extending in the lengthwise direction thereof and can freely change in shape due to its flexibility.

The first polarity electrode has a polarity opposite to that of the second polarity electrode. That is, when the first polarity electrode is an anode, the second polarity electrode is a cathode, or vice versa. Preferably, the first polarity electrode is an anode and the second polarity electrode is a cathode.

The electrode assembly 10 is not particularly limited in shape so long as it can perform general electrochemical functions by including an anode composed of an anode current collector and an anode active material bonded to the anode current collector, a cathode composed of a cathode current collector and a cathode active material bonded to the cathode current collector, and a separator or an electrolyte as an ionic path between the electrodes.

The covering 20 surrounding the electrode assembly 10 can be divided into the upper half part 21 and the lower half part 22 by a horizontal plane passing the center of the cross section orthogonal to the lengthwise direction of the cable-type secondary battery. The cross section is not necessarily divided equally by the upper half part 21 and the lower half part 22. Alternatively, one of the upper half part 21 or the lower half part 22 may also occupy a larger area than the other portion.

Heat produced from an electrode assembly of a conventional battery during charge and discharge increases the temperature of the battery to above a predetermined level. This phenomenon decomposes the electrode assembly or an electrolyte solution of the battery, and as a result, a large amount of gas is produced. The thermally conductive cover member as the upper half part 21 functions to release heat produced from the electrode assembly 10 upon charge and discharge to the outside. This heat release prevents an excessive temperature rise of the cable-type secondary battery.

The thermally insulating cover member as the lower half part 22 functions to block the transfer of heat produced from the electrode assembly 10 upon charge and discharge to the outside, so that the internal temperature rise cannot be sensed outside of the cover member. Particularly, the shape of the cable-type secondary battery of the present disclosure may be changed in the form of a wrist watch. In this case, although the cable-type secondary battery of the present disclosure comes into direct contact with the skin of a wearer, it cause no discomfort to his/her skin and can prevent the possibility that his/her skin may get burned. Therefore, the cable-type secondary battery of the present disclosure can perform an important function of allowing the wearer to use applications through its function of preventing the transfer of heat.

Referring to FIG. 2, the cable-type secondary battery 200 according to an embodiment has an elliptical cross section. The cable-type secondary battery 200 may be applied to a device in the form of a wrist watch by connecting both ends thereof. In this case, the lower half part 22 in direct contact with the wrist of a wearer can block the transfer of heat so as not to cause him/her discomfort and to protect him/her from the danger of getting burned. The upper half part 21 that is not in direct contact with the wrist allows heat from the battery to release to the outside therethrough, so that thermal stability and performance of the battery can be maintained.

The covering 20 may be produced by joining the upper half part 21 to the lower half part 22, which are prepared separately in advance. Alternatively, the covering 20 may be produced by simultaneously extruding a material for the upper half part 21 and a material for the lower half part 22.

The thermally conductive cover member may be composed of a mixture including a thermoplastic polymer resin and a filler. The filler is preferably present in an amount of 20 to 70 parts by weight, based on 100 parts by weight of the thermoplastic polymer resin. If the content of the filler is less than 20 parts by weight, the thermal conductivity of the thermally conductive cover member is unsatisfactory. Meanwhile, if the content of the filler exceeds 70 parts by weight, the flexibility of the cover member is deteriorated. As the thermoplastic polymer resin constituting the thermally conductive cover member, there may be used, for example: polyolefin, such as polyethylene or polypropylene; polyoxymethylene; polyester, such as polyethylene terephthalate or polybutylene terephthalate; polyamide; polysulfone, such as polyphenylene sulfone; polycarbonate; or polyvinyl chloride. As the filler, there may be used, for example, alumina, iron oxide or beryllium oxide.

As the thermally insulating cover member, there may be used, for example, polyester, polyamide, polyether sulfone, polyetherimide, polyimide, polyamideimide, polyamide siloxane, polyurethane, polystyrene, polycarbonate or polymethyl methacrylate.

The covering 20 is an insulator and is formed on the outer surface of the outer current collector to protect the electrodes against moisture in air and external impacts. Preferably, the current collectors of the first and second polarity electrodes are each independently made of stainless steel, aluminum, nickel, titanium, baked carbon, copper, stainless steel surface treated with carbon, nickel, titanium or silver, an aluminum-cadmium alloy, a non-conductive polymer surface treated with a conductive material, or a conductive polymer. The conductive material may be, for example, polyacetylene, polyaniline, polypyrrole, polythiophene, poly(sulfur nitride), indium tin oxide (ITO), copper, silver, palladium or nickel. As the conductive polymer, there may be used, for example, polyacetylene, polyaniline, polypyrrole, polythiophene or poly(sulfur nitride).

As the active material of the first polarity electrode, there may be used, for example: a carbonaceous material, such as natural graphite or artificial graphite; a metal (Me), such as a lithium-containing titanium composite oxide (LTO), Si, Sn, Li, Zn, Mg, Cd, Ce, Ni or Fe; an alloy of the metal (Me); an oxide (MeOx) of the metal (Me); or a composite of the metal (Me) with carbon. As the electrode material of the second polarity electrode, there may be used, for example, $LiCoO_2$, $LiNiO_2$, $LiMn_2O_4$, $LiCoPO_4$, $LiFePO_4$, $LiNiMnCoO_2$, or $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$, $x+y+z \leq 1$).

For example, the electrolyte layer may be formed of a gel-type solid electrolyte using PEO, PVdF, PMMA, PAN or PVAC, or a solid polymer electrolyte using PEO, polypropylene oxide (PPO), polyethylene imine (PEI), polyethylene sulphide (PES) or polyvinyl acetate (PVAc).

The electrolyte layer may further include a lithium salt. As the lithium salt, there may be used, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylate or lithium tetraphenylborate.

A brief explanation will be given of a method for fabricating the cable-type secondary battery having the above-described structure.

As described above, the cable-type secondary battery 100 according to an embodiment includes an electrode assembly 10 and a covering 20 capable of surrounding the electrode assembly. The electrode assembly 10 includes an anode, a cathode, and a separator or an electrolyte layer interposed between the anode and the cathode. Each of the anode and the cathode has an elongated shape and a structure in which an electrode active material is applied to the surface of a current collector whose shape in cross section orthogonal to the lengthwise direction thereof is circular, elliptical or polygonal. The covering 20 has an upper half part 21 and a lower half part 22.

First, the anode active material is coated on the surface of the linear anode current collector in the form of a wire. The coating can be carried out by a general process, specifically, electroplating or anodic oxidation, to produce the anode. Alternatively, when it is necessary to coat the active material at uniform intervals, the anode may be produced by extrusion coating an electrode slurry including the active material on the current collector through an extruder.

The electrolyte layer is formed by coating an electrolyte so as to surround the anode active material layer. There is no particular restriction on the method for coating the electrolyte. The use of extrusion coating is preferred taking into consideration the characteristics of the linear cable-type secondary battery and ease of formation of the electrolyte layer.

The cathode active material is coated on the surface of the electrolyte layer. The same process for coating the anode active material can apply for the coating of the anode active material. Thereafter, the cathode current collector in the form of a pipe is formed on the outer surface of the cathode active material layer.

Finally, the covering is formed on the outer surface of the cathode current collector in the form of a pipe. The covering is an insulator and is formed at the outermost surface to protect the electrodes against moisture in air and external impacts. A thermally conductive cover member and a thermally insulating cover member are prepared as the upper half part and the lower half part, respectively. After the thermally conductive cover member and the thermally insulating cover member are arranged so as to surround the outer surface of the cathode current collector in the form of a pipe, they are adhered to each other under heating to form the covering 20, completing fabrication of the cable-type secondary battery.

What is claimed is:

1. A cable-type secondary battery comprising: an electrode assembly comprising a first polarity electrode, a second polarity electrode, and a separator or an electrolyte layer interposed between the two electrodes, each of the electrodes having an elongated shape and a structure in which an electrode active material is applied to the surface of a current collector whose shape in cross section orthogonal to the lengthwise direction thereof is circular, elliptical or polygonal; and a covering capable of surrounding the electrode assembly, wherein the covering comprises a thermally conductive cover member as an upper half part and a thermally insulating cover member as a lower half part, which are divided by a horizontal plane passing the center of the cross section orthogonal to the lengthwise direction of the cable-type secondary battery.

2. The cable-type secondary battery according to claim 1, wherein the thermally conductive cover member comprises 100 parts by weight of a thermoplastic polymer resin and 20 to 70 parts by weight of a filler.

3. The cable-type secondary battery according to claim 2, wherein the thermoplastic polymer resin is selected from the group consisting of polyolefin, polyoxymethylene, polyamide, polysulfone, polyester, polycarbonate, polyvinyl chloride, and mixtures thereof.

4. The cable-type secondary battery according to claim 2, wherein the filler is selected from the group consisting of alumina, iron oxide, beryllium oxide, and mixtures thereof.

5. The cable-type secondary battery according to claim 1, wherein the thermally insulating cover member comprises at least one polymer selected from the group consisting of polyester, polyamide, polyether sulfone, polyetherimide, polyimide, polyamideimide, polyamide siloxane, polyurethane, polystyrene, polycarbonate and polymethyl methacrylate.

6. The cable-type secondary battery according to claim 1, wherein the first polarity electrode is an anode and the second polarity electrode is a cathode.

7. The cable-type secondary battery according to claim 1, wherein the electrode material of the first polarity electrode is selected from the group consisting of: carbonaceous materials, comprising natural graphite and artificial graphite; metals (Me), comprising lithium-containing titanium composite oxides (LTO), Si, Sn, Li, Zn, Mg, Cd, Ce, Ni and Fe; alloys of the metals (Me); oxides (MeOx) of the metals (Me); composites of the metals (Me) with carbon; and mixtures thereof.

8. The cable-type secondary battery according to claim 1, wherein the electrode material of the second polarity electrode is selected from the group consisting of $LiCoO_2$, $LiNiO_2$, $Li_2Mn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$, $x+y+z \leq 1$), and mixtures thereof.

9. The cable-type secondary battery according to claim 1, wherein the current collectors of the first and second polarity electrodes are each independently made of stainless steel, aluminum, nickel, titanium, baked carbon, copper, stainless steel surface treated with carbon, nickel, titanium or silver, an aluminum-cadmium alloy, a non-conductive polymer surface treated with a conductive material, or a conductive polymer.

10. The cable-type secondary battery according to claim 9, wherein the conductive material is selected from the group consisting of polyacetylene, polyaniline, polypyrrole, polythiophene, poly(sulfur nitride), indium tin oxide (ITO), copper, silver, palladium, nickel, and mixtures thereof.

11. The cable-type secondary battery according to claim 9, wherein the conductive polymer is selected from the group consisting of polyacetylene, polyaniline, polypyrrole, polythiophene, poly(sulfur nitride), and mixtures thereof.

12. The cable-type secondary battery according to claim 1, wherein the electrolyte layer is formed of an electrolyte selected from: gel-type solid electrolytes using PEO, PVdF, PMMA, PAN or PVAC; and solid polymer electrolytes using PEO, polypropylene oxide (PPO), polyethylene imine (PEI), polyethylene sulphide (PES) or polyvinyl acetate (PVAc).

13. The cable-type secondary battery according to claim 1, wherein the electrolyte layer further comprises a lithium salt.

14. The cable-type secondary battery according to claim 13, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylate, lithium tetraphenylborate, and mixtures thereof.

* * * * *